UNITED STATES PATENT OFFICE.

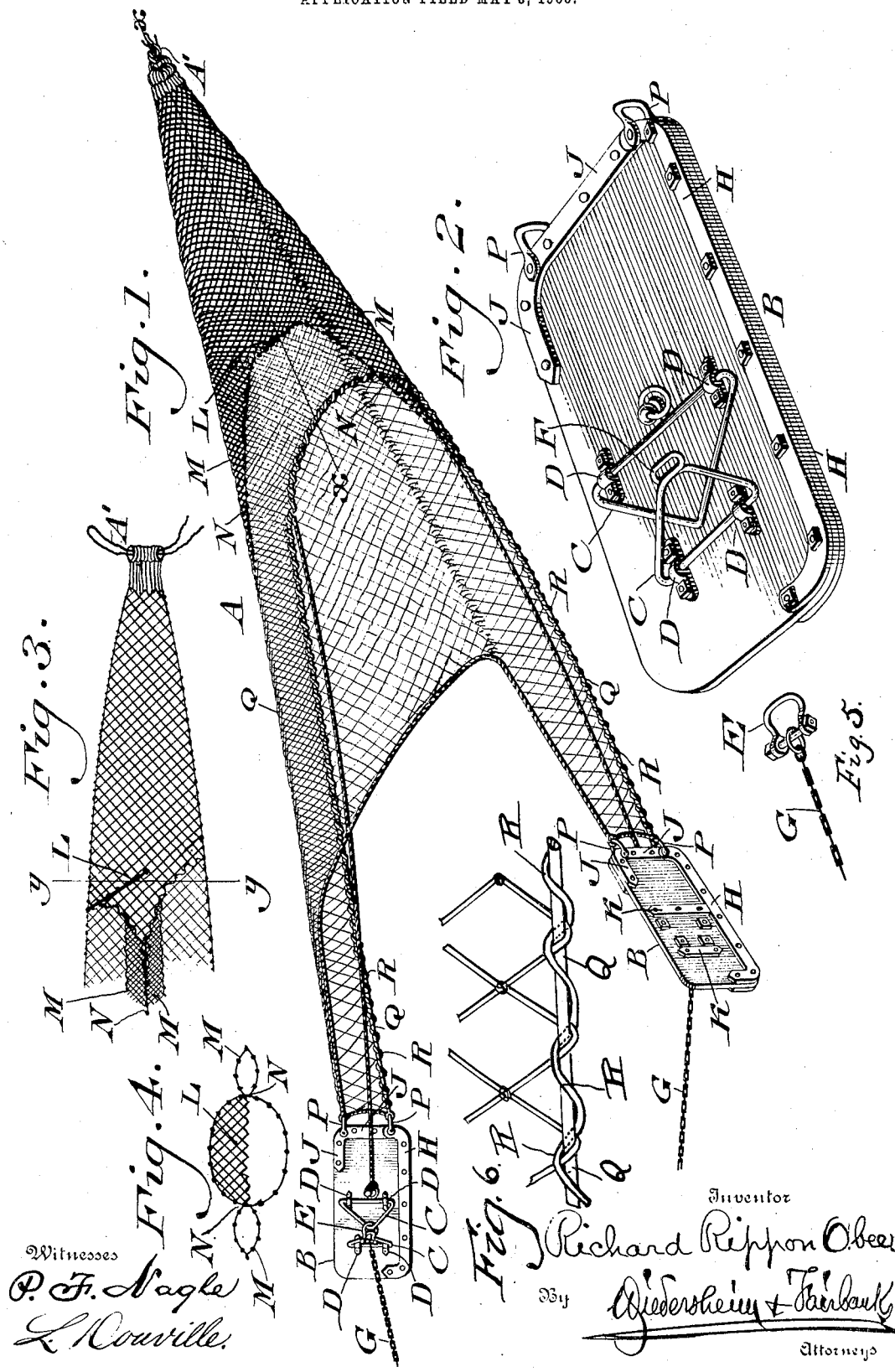

RICHARD RIPPON OBEE, OF NEW YORK, N. Y.

TRAWL-NET.

No. 852,135.   Specification of Letters Patent.   Patented April 30, 1907.

Application filed May 3, 1906. Serial No. 315,062.

*To all whom it may concern:*

Be it known that I, RICHARD RIPPON OBEE, a subject of the King of Great Britain, residing at the city, county, and State of New York, have invented a new and useful Trawl-Net, of which the following is a specification.

My invention consists of an improvement in a trawl net whereby the members of the same are more effective in operation, they possess increased strength and may be folded in compact form as will be hereinafter described, the novel features being pointed out in the claim.

Figure 1 represents a perspective view of a trawl net embodying my invention. Fig. 2 represents a perspective view of a detached portion thereof on an enlarged scale. Fig. 3 represents a longitudinal section of a portion on line $x$—$x$ Fig. 1. Fig. 4 represents a transverse section of a portion on line $y$—$y$ Fig. 3. Fig. 5 represents a perspective view of a detached portion. Fig. 6 is an enlarged detail showing the connection of the mesh to the weighting member.

Similar letters of reference indicate corresponding parts in the figures.

Referring to the drawings: A designates a trawl net to the mouth of which are connected the boards or wings B,B, which are adapted to keep said mouth distended or spread apart. On said boards are the brackets C, C, which are pivotally connected with the same by means of ears D which freely embrace the bases of said brackets and are secured to said boards, said brackets being preferably of triangular form so they may be united at the apexes by means of the clevis or shackles E which are passed around said apexes, one of each of said brackets having an eye F thereon to receive said shackle, whereby said brackets may be connected when in operative position as shown in Fig. 1 and retained in said position, it being noticed that the draft cords or chains G are attached to said shackles, whereby the net may be properly operated.

It will be seen that when the shackles are removed, the brackets may be folded on each other and on the boards B, a matter of importance when the net is not in use, in which case the boards may occupy but little space on the deck of a vessel or elsewhere.

Connected with the undersides of the boards B are the shoes H which are preferably formed of metal and adapted to move on the bottom of the water and while they strengthen the boards, they act as runners to take up the wear and so prevent injury to the boards, said shoes also extending along the rear ends and tops of the boards as at J, thus stiffening said parts.

Connected with the sides of the boards are the plates K which are preferably formed of metal to strengthen said sides.

Within the net intermediate of its ends is a short section of net as at L which depends from what may be termed the top of the net and is yielding so that after a fish has passed the section and attempts to return toward the mouth of the net, said section may be pushed by the fish toward said mouth to a limited extent, when it ceases to yield and then forms a barrier to further return of the fish.

On the sides of the section L are pockets M which are formed by closing portions of the net along the line N which extends gradually to the sides of the net, the place of junction with said sides being closed. This forms said pockets M which are open at rear and provides chambers into which the fish may swim from which however they cannot escape toward the mouth of the net, but from which they may swim rearward, then forward passing through the center of the net, being resisted by the section or hanger L hereinbefore referred to.

The rear end of the net is adapted to be opened to permit the removal of the fish. For this purpose, the loops or meshes at said end are gathered by the draw string A' which closes said end and which when loosened, relieves said loops or meshes and permits them to separate, the effect of which is evident.

The couplings P of the net and boards are also connected with the braces J, thus adding strength to said coupling.

Q designates a piece of wire which extends along the bottom of the net and across the same, its ends being secured to the lower sides of the boards B. A piece R of rope is spirally wound tightly on said piece Q and the adjacent meshes of the net are fitted on said piece Q between the convolutions of the rope R by which provision, said meshes are prevented from shifting and so are properly held in place, the piece Q also preserving the shape of the bottom of the net and serving to weight the same.

Having thus described my invention, what

I claim as new and desire to secure by Letters Patent, is:

1. In a trawl net, a spreader board at the mouth thereof, a pair of oppositely disposed brackets pivotally mounted on said board with their apices adapted to overlap, an eye at the apex of one of said brackets, means on said board for the attachment of a net, and a shackle engaging said eye and the apex of the other bracket.

2. In a trawl net, the combination with a spreader board, of a shoe extending along the bottom, along the rear end and the top of the spreader board, couplings secured to the rear end portion of said shoe, angular brackets oppositely disposed and pivotally mounted on said spreader board, and stiffening plates upon the opposite side of said board in proximity to the securing means of said brackets.

3. In a trawl net, a suspended yielding flap within and inclosed by the net and disposed across the throat of the latter.

4. In a trawl net, pockets, and a flap suspended between said pockets within the net and adapted to obstruct the central throat between the pockets.

5. In a trawl net, pockets closed at the front and inner sides by the walls of the net, and a flap suspended between said pockets within the net and adapted to obstruct the central throat between the pockets.

6. In a trawl net, pockets closed at the front and inner sides by the walls of the net, and a swinging, yielding flap suspended between said pockets within the net and adapted to obstruct the central throat between the pockets.

7. In a trawl net, a shaping and weighting member thereof, consisting of a piece of material such as wire and rope wound on said piece the mesh of the net being on said piece between the convolutions of said rope.

RICHARD RIPPON OBEE.

Witnesses:
C. L. YEATON,
E. B. THOMPSON.